United States Patent
Denbo et al.

(10) Patent No.: US 10,124,702 B2
(45) Date of Patent: Nov. 13, 2018

(54) CHILD RESTRAINT WITH BELT MANAGEMENT SYSTEM

(71) Applicant: Dorel Juvenile Group, Inc., Foxboro, MA (US)

(72) Inventors: Sean R. Denbo, Columbus, IN (US); Mei-Hui Lin, Nashville, IN (US); Kyle M. Franke, Columbus, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 15/339,090

(22) Filed: Oct. 31, 2016

(65) Prior Publication Data

US 2017/0120781 A1    May 4, 2017

Related U.S. Application Data

(60) Provisional application No. 62/248,617, filed on Oct. 30, 2015.

(51) Int. Cl.
*A47C 1/08* (2006.01)
*A47C 1/10* (2006.01)
*B60N 2/28* (2006.01)

(52) U.S. Cl.
CPC ......... *B60N 2/2812* (2013.01); *B60N 2/2851* (2013.01); *B60N 2/2872* (2013.01); *B60N 2002/2818* (2013.01)

(58) Field of Classification Search
CPC .. B60N 2/2812; B60N 2/2851; B60N 2/2872; B60N 2/265; B60N 2/2842; B60N 2/468; B60N 2/688; B60N 2002/2818; B60R 2022/029; B60R 22/105; B60R 22/12; B60R 22/34; A44B 11/26
USPC ............ 297/256.15, 256.16, 250.1, 481, 467
See application file for complete search history.

(56) References Cited

U.S. PATENT DOCUMENTS

| 6,042,188 | A | * | 3/2000 | Gold | B60R 22/023 |
| | | | | | 248/304 |
| 6,305,745 | B1 | * | 10/2001 | Rijsdijk | B60N 2/2806 |
| | | | | | 297/250.1 |
| 6,336,682 | B1 | | 1/2002 | Rosko | |
| 6,672,663 | B2 | | 1/2004 | Kain | |
| 6,698,841 | B1 | | 3/2004 | Glover et al. | |
| 7,350,862 | B2 | | 4/2008 | Fransen et al. | |
| 7,445,286 | B2 | | 11/2008 | Siewertsen et al. | |
| 8,038,214 | B2 | | 10/2011 | Brandi et al. | |
| 8,308,244 | B2 | * | 11/2012 | Parker | B60N 2/36 |
| | | | | | 297/481 |
| 8,608,246 | B1 | * | 12/2013 | Teague | B60N 2/2812 |
| | | | | | 297/250.1 |
| 8,911,015 | B2 | | 12/2014 | Cohen et al. | |
| 8,985,697 | B2 | * | 3/2015 | Johnson | H01F 7/0263 |
| | | | | | 297/481 |
| 9,713,968 | B1 | * | 7/2017 | Richardson | B60R 22/105 |
| 2005/0179289 | A1 | * | 8/2005 | Fuller | A47D 13/025 |
| | | | | | 297/250.1 |
| 2011/0037302 | A1 | * | 2/2011 | Tharp | B60N 2/2812 |
| | | | | | 297/256.15 |

(Continued)

*Primary Examiner* — Mark R Wendell
(74) *Attorney, Agent, or Firm* — Barnes & Thornburg LLP

(57) ABSTRACT

A child restraint includes a juvenile seat and a child-restraint harness coupled to the juvenile seat. The child-restraint harness includes a crotch belt having a buckle and two shoulder belts that can be linked to the buckle to restrain a child sitting on the juvenile seat.

14 Claims, 7 Drawing Sheets

(56) References Cited

U.S. PATENT DOCUMENTS

| | | | |
|---|---|---|---|
| 2011/0133528 A1* | 6/2011 | Keith | B60N 2/2803 |
| | | | 297/216.11 |
| 2011/0227392 A1 | 9/2011 | Morrissey | |
| 2013/0015691 A1* | 1/2013 | Feng | B60N 2/2812 |
| | | | 297/256.15 |
| 2013/0285424 A1* | 10/2013 | Gardner | A47D 13/025 |
| | | | 297/250.1 |
| 2013/0334852 A1 | 12/2013 | Miley | |
| 2014/0008960 A1 | 1/2014 | Lin et al. | |
| 2016/0193943 A1* | 7/2016 | Grey | B60N 2/2845 |
| | | | 297/256.15 |

* cited by examiner

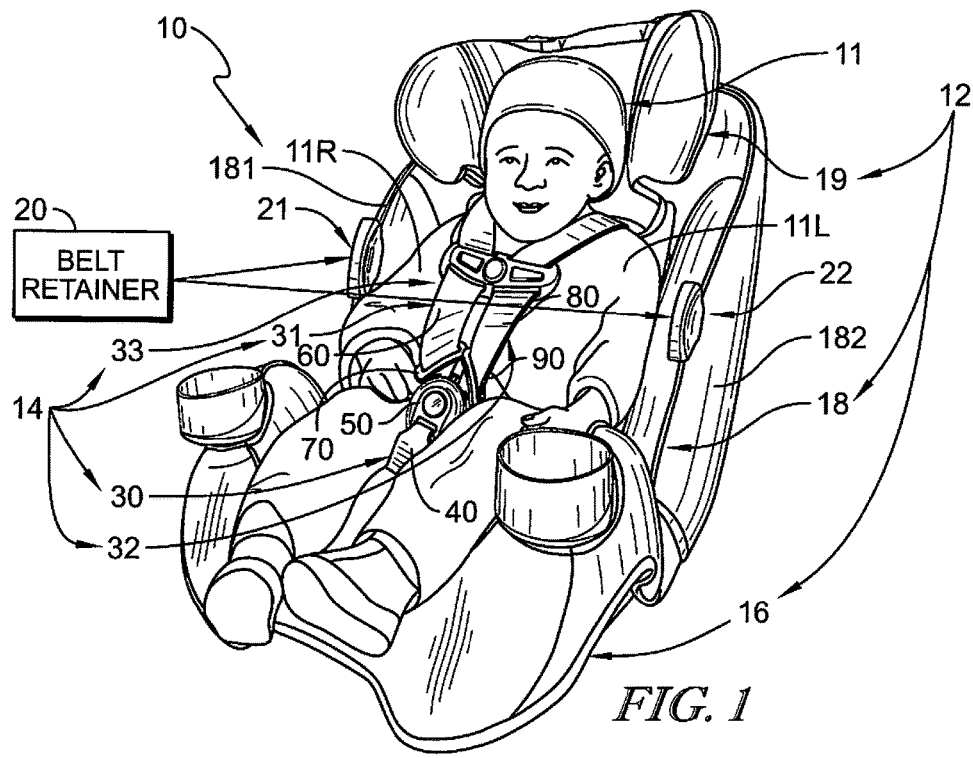
FIG. 1
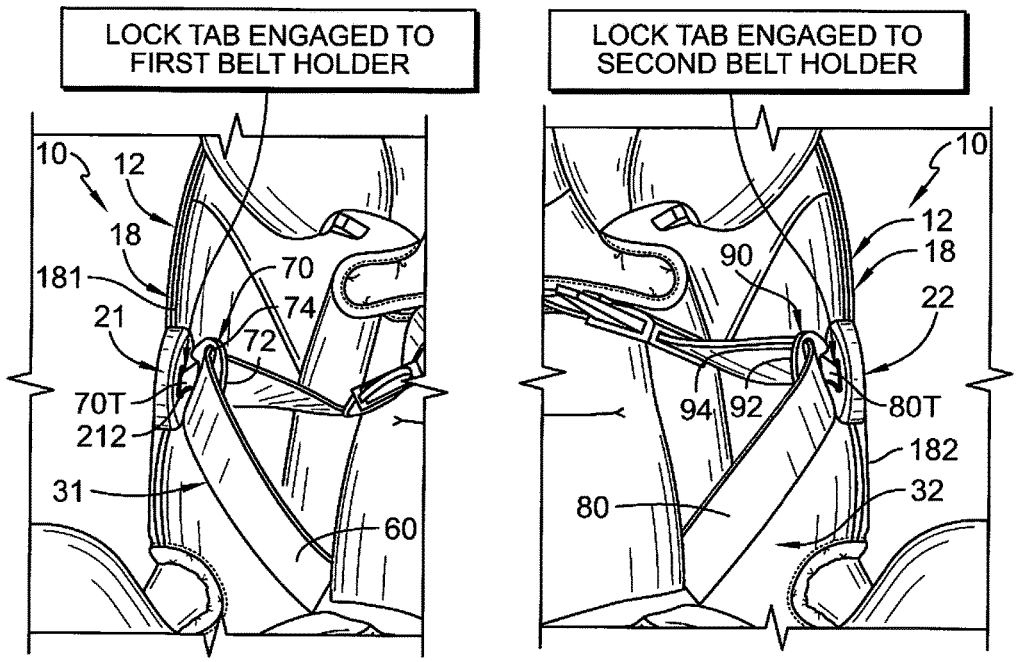
FIG. 2A
FIG. 2B

CHILD RESTRAINT WITH BELT MANAGEMENT SYSTEM

PRIORITY CLAIM

This application claims priority under 35 U.S.C. § 119(e) to U.S. Application No. 62/248,617 filed Oct. 30, 2015, which is expressly incorporated by reference herein.

BACKGROUND

The present disclosure relates to child restraints and in particular to juvenile seats for use on passenger seats in vehicles. More particularly, the present disclosure relates to a belt management system for managing restraint belts associated with a juvenile seat.

SUMMARY

According to the present disclosure, a child restraint includes a juvenile seat having a seat bottom and a seat back extending upwardly from the seat bottom. In illustrative embodiments, the child restraint also includes a first belt holder coupled to a first side of the seat back, a second belt holder coupled to an opposite second side of the seat back, and a child-restraint harness. The child-restraint harness comprises a crotch belt coupled to the seat bottom, a first side belt coupled to the seat back and adapted to be coupled to the crotch belt to restrain the right side of a child seated on the juvenile seat, and a second side belt coupled to the seat back and adapted to be coupled to the crotch belt to restrain the left side of a child seated in the juvenile seat.

In illustrative embodiments, in a closed child-restraining mode of the child-restraint harness, the first and second side belts are engaged to the crotch belt to cooperate with the crotch belt to restrain a child seated in the juvenile seat. In an alternative opened child-seating-and-releasing mode of the child-restraint harness, the first and second side belts are disengaged from the crotch belt and the first side belt is engaged with the first side belt holder and the second side belt is engaged with the second belt holder to provide lateral separation between the first and second side belts and retain the side belts in such a separated position so that an open child-receiving space is provided above the seat bottom and between the first and second side belts to make it easy for a caregiver to set a child to be restrained on the juvenile seat without having to move the side belts apart with one hand at the same time the child is being placed in the juvenile seat with the other hand. Once seated, the first and second side belts are disengaged from the first and second belt holders and re-engaged to the crotch belt to re-establish the closed child-restraining mode of the child-restraint harness. When it is desired to remove a child from the juvenile seat, a caregiver can engage the first side belt to the first belt holder and engage the second side belt to the opposite second belt holder to release the seated child for easy removal from the child seat.

In illustrative embodiments, the crotch belt includes a crotch strap coupled to the seat bottom and a buckle coupled to a free end of the crotch strap. Each of the first and second side belts includes a side strap and a strap anchor coupled to the companion side strap and formed to include a lock tab sized to be inserted into and retained in a companion tab-receiving socket formed in the buckle of the crotch belt so that the first and second side belts are coupled to the crotch belt to establish the closed child-restraining mode of the child-restraint harness. A child seated in the vehicle seat is restrained by the child-restraint harness when the lock tab of each strap anchor is mated with the buckle of the crotch belt.

In illustrative embodiments, a caregiver can change the child-restraint harness to the opened child-seating-and-releasing mode by gripping and moving each of the lock tabs included in the side belts relative to the juvenile seat to mate with one of the first and second belt holders. This causes the first and second side straps included in the side belts to be moved to laterally separated positions above the seat bottom and along vertical side edges of the seat back and held by the belt holders in those separated positions so that the straps are out of the way and do not interfere with the process of seating a child on the juvenile seat or releasing the child from the juvenile seat.

In illustrative embodiments, once the child is seated, the caregiver can take a first step to re-establish the closed child-restraining mode of the child-restraint harness by removing the first lock tab from the first belt holder mounted on one side of the seat back and inserting it into a companion first tab-receiving socket provided in the buckle of the crotch belt to mate the first side belt to the crotch belt so that the left side of the seated child is restrained by the first side strap of the first side belt. Then the caregiver can take a second step to re-establish the closed child-restraining mode of the child restraint harness by removing the second lock tab from the second belt holder mounted on an opposite side of the seat back and inserting it into a companion second tab-receiving socket provided in the buckle of the crotch belt to mate the second side belt to the crotch belt so that the right side of the seated child is restrained by the second side strap of the second side belt.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a child restraint in accordance with the present disclosure including a juvenile seat comprising a seat bottom and a seat back extending upwardly from the seat bottom, a first belt holder coupled to a far side of the seat back, a second belt holder coupled to a near side of the seat back and a child-restraint harness shown in a closed child-restraining mode and showing that the child-restraint harness comprises a crotch belt coupled to the seat belt, a first side belt coupled to the seat back and to a buckle included in the crotch belt to restrain the right side of the child seated in the juvenile seat, and a second side belt coupled to the seat back and to the buckle included in the crotch belt to restrain the left side of the child seated in the juvenile seat;

FIG. 2A is an enlarged perspective view of a portion of the first side belt after the child-restraint harness had been placed by a caregiver in an opened child-seating-and-releasing mode and showing that a first lock tab that is included in the first side belt and is configured normally to mate with a first tab-receiving socket included in the buckle of the crotch belt when the child-restraint harness is placed in the closed child-restraining mode shown in FIG. 1 can be inserted by the caregiver into a tab-receiver socket formed in the first belt holder to hold the first side belt in an opened position away from the crotch belt and generally away from the seat bottom and seat back;

FIG. 2B is a perspective view similar to FIG. 2A but showing a portion of the second side belt after the child-restraint harness had been placed by a caregiver in an opened child-seating-and-releasing mode and showing that a second lock tab that is included in the second side belt and is configured normally to mate with a second tab-receiving socket included in the buckle of the crotch belt when the child-restraint harness is placed in the closed child-restraining mode shown in FIG. 1 can be inserted by the caregiver into a tab-receiver socket formed in the second belt holder to hold the second side belt in an opened position away from the crotch belt and generally away from the seat bottom and seat back;

DETAILED DESCRIPTION

Figure 6:
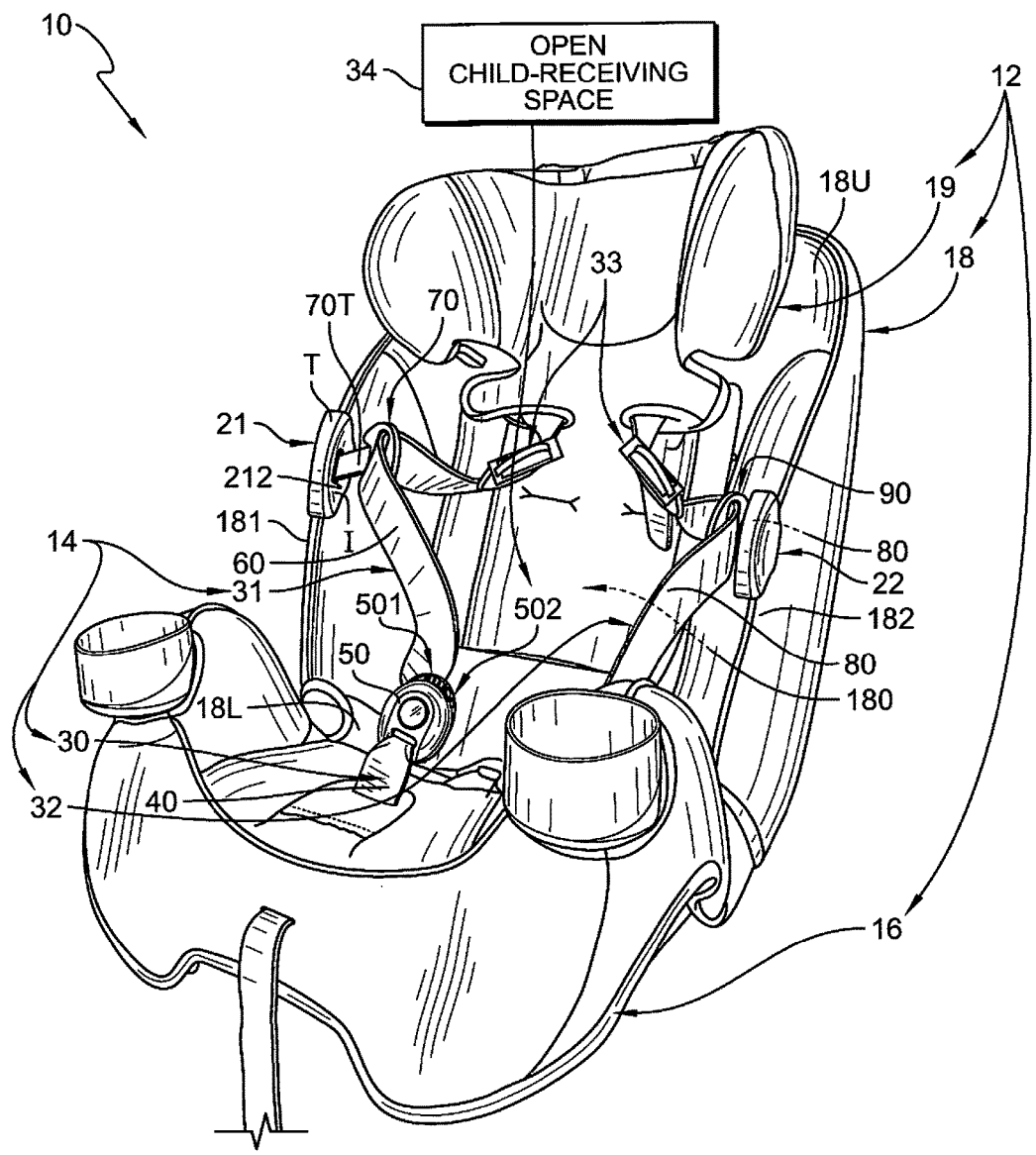
FIG. 6 is an enlarged view of the child restraint of FIG. 1 showing that the child-restraint harness is in an opened child-seating-and-receiving mode owing to insertion of the first lock tab of the first side belt into a companion tab-receiver socket formed in the first belt holder and insertion of the second lock tab of the second side belt into a companion tab-receiver socket formed in the second belt holder.

An illustrative child restraint 10 comprises a juvenile seat 12 and a child-restraint harness 14 coupled to juvenile seat 12 and adapted to be changed by a caregiver from a closed child-restraining mode shown in FIG. 1 to an opened child-seating-and-releasing mode shown in FIGS. 2A, 2B, and 6.

Juvenile seat 12 includes a seat bottom 16, a seat back 18 arranged to extend upwardly from seat bottom 16, and a headrest 19 mounted for up-and-down movement on seat back 18. Child restraint 10 further includes a belt retainer 20 comprising a first belt holder 21 coupled to a far side of seat back 18 as suggested in FIGS. 1 and 3 and a second belt holder 22 coupled to a near side of seat back 18 as suggested in FIGS. 1 and 3 and configured to cooperate with first belt holder 21 to retain child-restraint harness 14 in the opened child-seating-and-releasing mode shown in FIG. 6.

Figure 3:
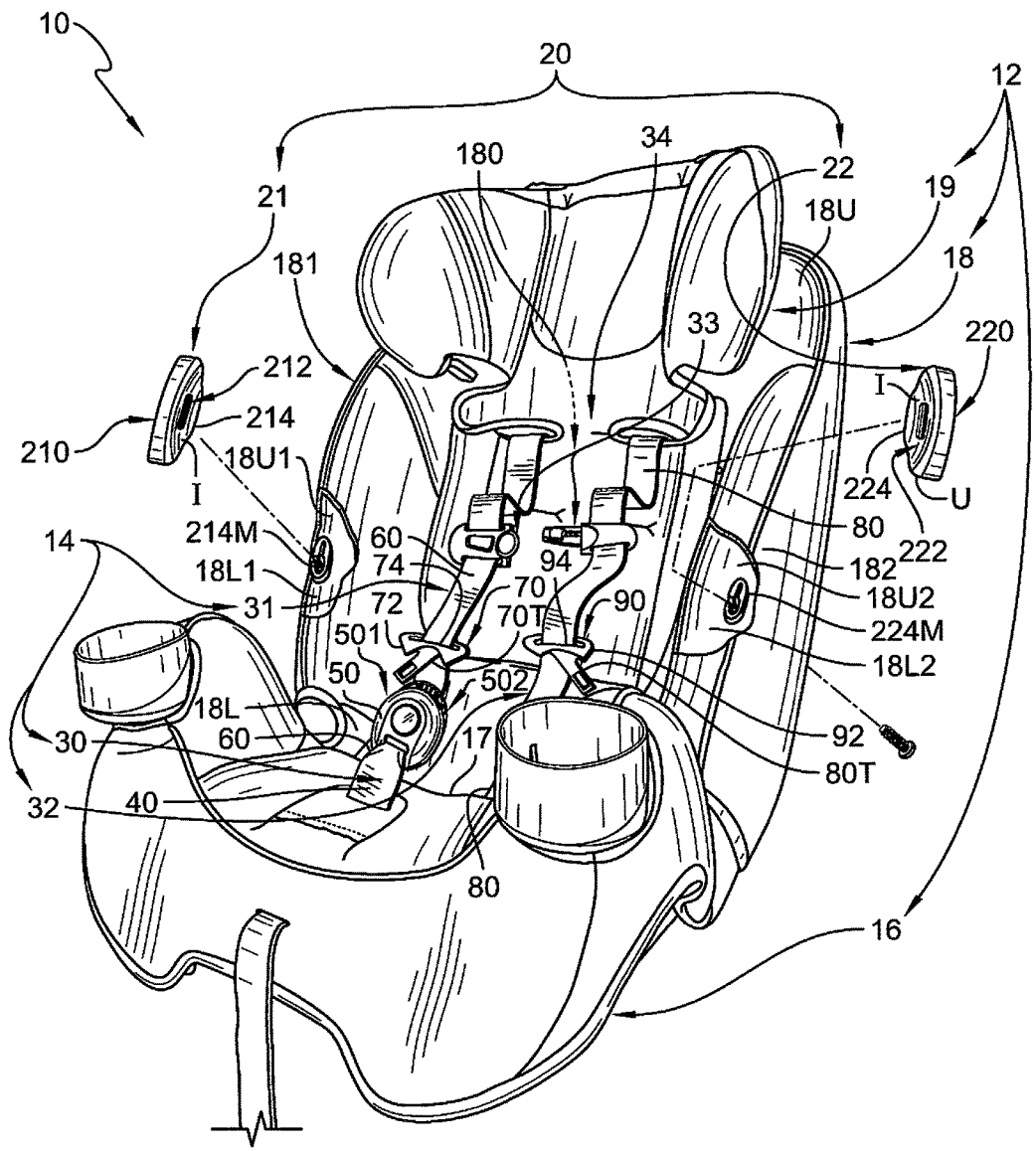
FIG. 3 is an enlarged perspective view of the child restraint of FIG. 1 before the first and second belt holders are coupled to the seat back and after the lock tabs of the first and second side belts have been removed from companion tab-receiving sockets formed in the buckle of the crotch belt by a caregiver to initiate change of the child-restraint harness from the closed child-restraining mode shown in FIG. 1 to an opened child-seating-and-releasing mode shown in FIG. 6 and showing that each of the first and second belt holders is formed to include a tab-receiver socket for receiving one of the lock tabs of the first and second belts and suggesting that the tab-receiver sockets will open toward one another when the belt holders are mounted on the seat back.
Figure 4:
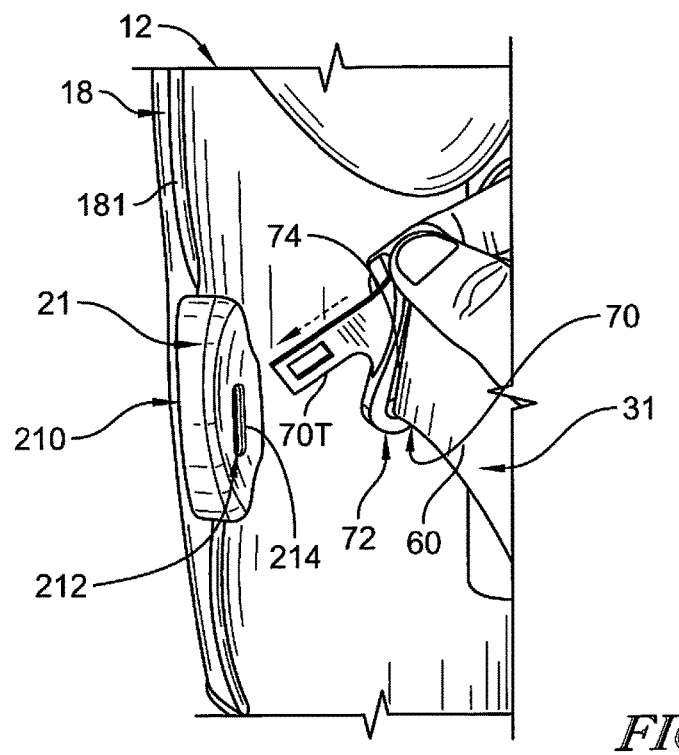
FIG. 4 is an enlarged perspective view as the first lock tab of the first side belt is about to be inserted into a tab-receiver socket formed in the first belt holder mounted on a far side of the seat back.
Figure 5:
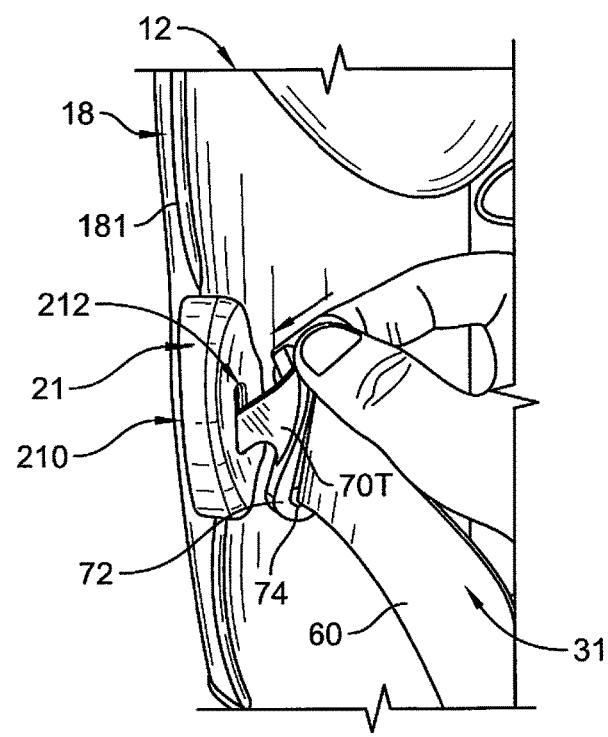
FIG. 5 is a view similar to FIG. 4 after the first lock tab of the first side belt has been inserted by the caregiver into the tab-receiver socket formed in the first belt holder.

The child-restraint harness 14 comprises a crotch belt 30 coupled to seat bottom 16, a first side belt 31 coupled to seat back 18 and adapted to be coupled to crotch belt 30 to restrain the right side 11R of a child 11 seated on juvenile seat 12, and a second side belt 32 coupled to seat back 18 and adapted to be coupled to crotch belt 30 to restrain the left side 11L of a child 11 seated in juvenile seat 12. Child-restraint harness 14 also includes a two-piece harness retainer 33 coupled to upper portions of first and second side belts 31, 32 as shown in FIGS. 1, 3, and 6. In illustrative embodiments, an upper portion of each side belt 31, 32 illustratively passes through an upper slot formed in an upper portion of seat back 18 and a lower portion of each side belt 31, 32 passes through a lower slot formed in a lower portion of seat back 18 and located near seat bottom 16.

In illustrative embodiments, in a closed child-restraining mode of child-restraint harness 14, the first and second side belts 31, 32 are engaged to crotch belt 30 to cooperate with crotch belt 30 to restrain a child 11 seated in juvenile seat 12. In an alternative opened child-seating-and-releasing mode of child-restraint harness 14, the first and second side belts 31, 32 are disengaged from crotch belt 30 and the first side belt 31 is engaged with the first side belt holder 21 and the second side belt 32 is engaged with the second belt holder 22 to provide lateral separation between the first and second side belts 31, 32 and retain the side belts 31, 32 in such a laterally separated position so that an open child-receiving space 34 is provided above the seat bottom 16 and between the first and second side belts 31, 32 to make it easy for a caregiver to seat a child 11 to be restrained on juvenile seat 12 without having to move the side belts 31, 32 apart with one hand at the same time the child 11 is being placed in the juvenile seat 12 with the other hand. Once child 11 is seated, the first and second side belts 31, 32 are disengaged from the first and second belt holders 21, 22 and re-engaged to the crotch belt 30 to re-establish the closed child-restraining mode of child-restraint harness 14.

Crotch belt 30 includes a crotch strap 40 coupled to seat bottom 16 and a buckle 50 coupled to a free end of crotch strap 40 as suggested in FIG. 3. First side belt 31 includes a first side strap 60 and a first strap anchor 70 coupled to first side strap 60 and formed to include a first lock tab 701 sized to be inserted into and retained in a first tab-receiving socket 501 formed in buckle 50 of crotch belt 30. Second side belt 32 includes a second side strap 80 and a second strap anchor 90 coupled to second side strap 80 and formed to include a second lock tab 802 sized to be inserted into and retained in a second tab-receiving socket 502 formed in buckle 50 of crotch belt 30. Engagement of lock tabs 701, 802 in the corresponding tab-receiving sockets 501, 502 of buckle 50 causes first and second side belts 31, 32 to be coupled to crotch belt 30 to establish the closed child-restraining mode of child-restraint harness 14. A child 11 seated in juvenile seat 12 is restrained by the child-restraint harness 14 when the lock tab 701 or 802 of each strap anchor 70 or 90 is mated with the buckle 50 of the crotch belt 30.

In illustrative embodiments, a caregiver can change the child-restraint harness 14 to the opened child-seating-and-releasing mode shown in FIG. 6 by disengaging each of the lock tabs 701, 802 included in the side belts 31, 32 from buckle 50 of crotch belt 30 and moving lock tabs 701, 802 relative to the juvenile seat 12 to mate with a companion one of the first and second belt holders 21, 22. This causes the first and second side straps 60, 80 included in the side belts 31, 32 to be moved to laterally separated positions above the seat bottom 16 and along vertical side edges of the seat back 18 and held by the belt holders 21, 22 in those laterally separated positions so that the side straps 60, 80 are out of the way and do not interfere with the process of seating a child 11 on juvenile seat 12 or releasing a child 11 from juvenile seat 12.

Figures 7, 8:
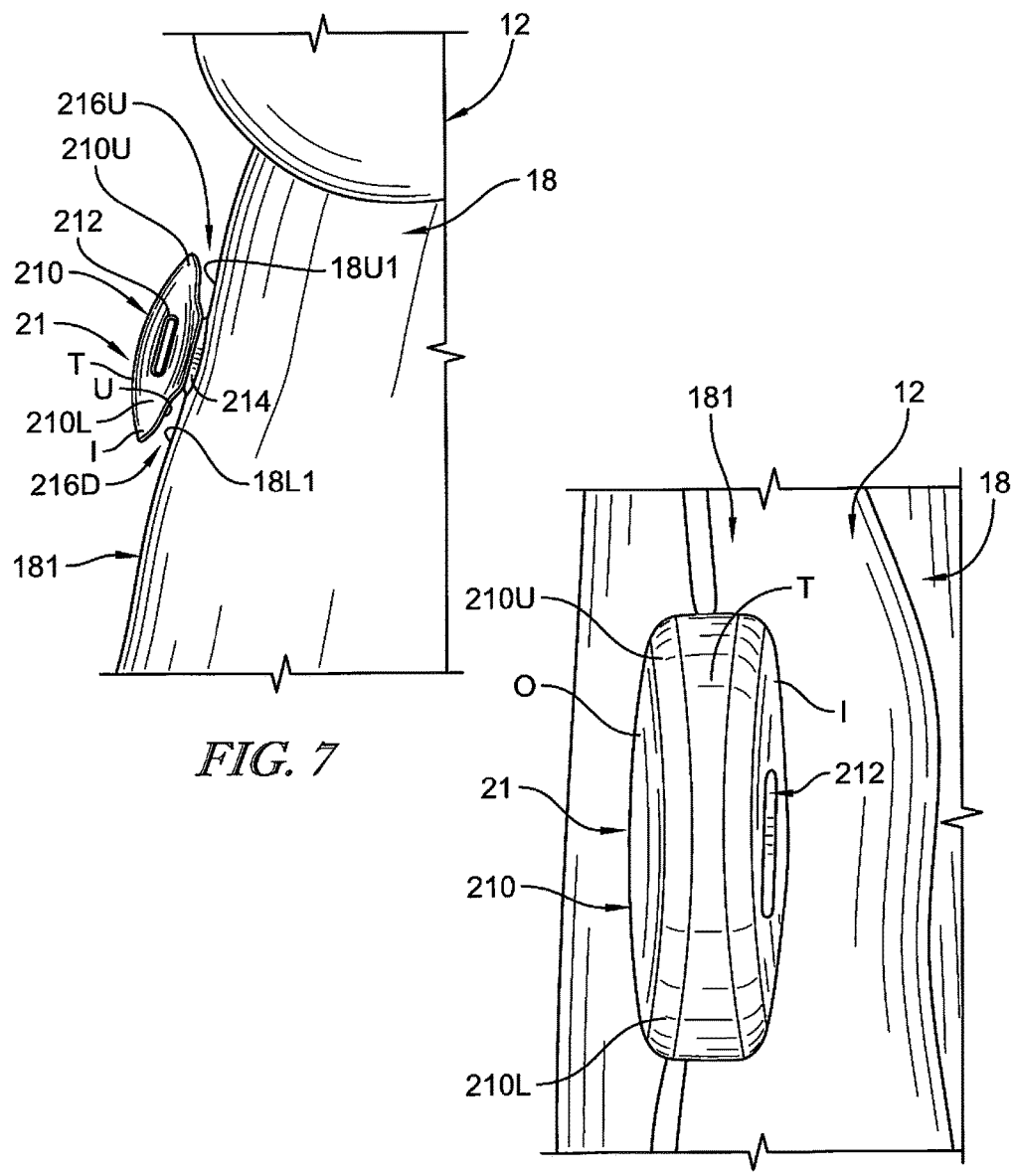
FIG. 7 is a side elevation view of the first belt holder shown in FIG. 4.
FIG. 8 is an enlarged front elevation view of the first belt holder of FIG. 7.

First belt holder 21 includes a body 210 formed to include a tab-receiver socket 212 and a body-support post 214 coupled to an underside of body 210 as shown in FIG. 7. Body 210 is oriented to cause tab-receiver socket 212 to open toward the opposing second belt holder 22 as suggested in FIGS. 1 and 3. A free end of body-support post 214 is coupled to a first side edge of seat back 18 as shown in FIG. 7 to form a downwardly opening strap-guide channel 216D defined between a lower portion 210L of body 210 and a first lower segment 18L1 of seat back 18 and to form an upwardly opening strap-guide channel 216U defined between an upper portion 210U of body 210 and a first upper segment 18U1 of seat back 18 and provided to receive and retain a portion of first side strap 60 as suggested in FIG. 10.

First strap anchor 70 includes a base 72 formed to include a strap-receiver slot 74 and first lock tab 701 is cantilevered to a middle section of base 72 as shown in FIG. 3. First side strap 60 is passed through and slides freely in the strap-receiver slot 74 formed in base 72. In illustrative embodiments, first lock tab 701 is made of a metal material and base 72 is made of a plastics material. When inserted into the tab-receiver socket 212 formed in body 210 of first belt holder 21 as part of an effort to establish the opened child-seating-and-releasing mode of child restraint 10, most of first lock tab 701 is contained in that tab-receiver socket 212 and not available to be touched by a child or caregiver.

Figures 9, 9A:
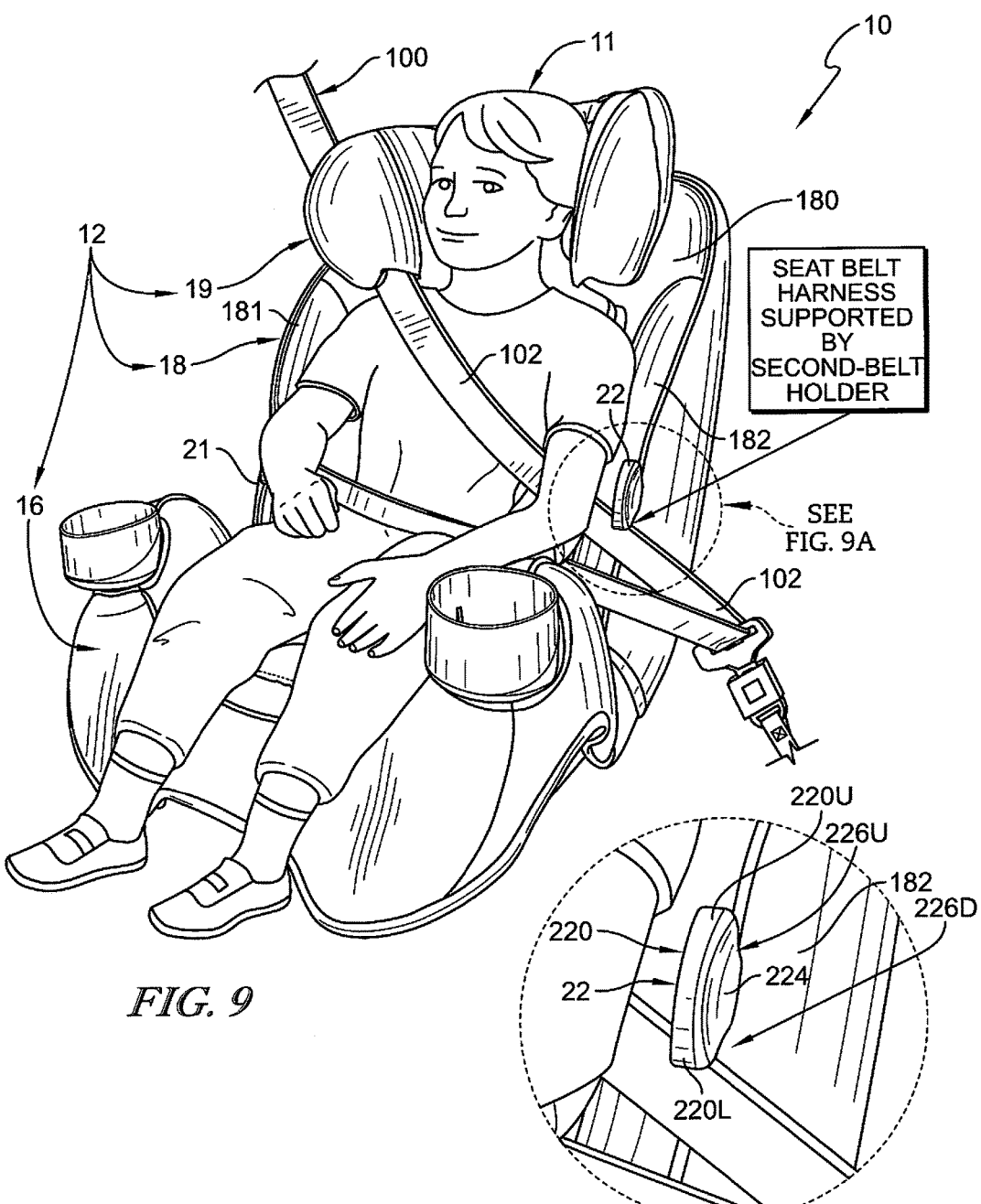
FIG. 9 is a view of the child restraint of FIG. 1 in a booster mode wherein a shoulder strap included in a passenger-restraint belt of a vehicle is used to restrain an older child seated in the juvenile seat and is arranged to extend upwardly into a downwardly opening strap-guide channel defined between the second belt holder and the seat back.
FIG. 9A is an enlarged view of a circled region shown in FIG. 9 to show features of the second belt holder in more detail.

Second belt holder 22 includes a body 220 formed to include a tab-receiver socket 222 and a body-support post 224 coupled to an underside of body 220 as shown in FIG. 9A. Body 220 is oriented to cause tab-receiver socket 222 to open toward the opposing first belt holder 21 as suggested in FIGS. 1 and 3. A free end of body-support post 224 is coupled to a second side edge of seat back 18 as shown in FIGS. 9 and 9A to form a downwardly opening strap-guide channel 226D defined between a lower portion 220L of body 220 and a second lower segment 18L2 of seat back 18 and to form an upwardly opening strap-guide channel 226U defined between an upper portion 220U of body 220 and a second upper segment 18U2 of seat back 18. Upwardly opening strap-guide channel 226U is provided to receive and retain a portion of second side strap 80 in a manner similar to that shown in FIG. 10.

Second strap anchor 90 includes a base 92 formed to include a strap-receiver slot 94 and second lock tab 802 is cantilevered to a middle section of base 92 as shown in FIG. 3. Second side strap 80 is passed through and slides freely in the strap-receiver slot 94 formed in base 92. In illustrative embodiments, second lock tab 802 is made of a metal material and base 92 is made of a plastics material. When inserted into the tab-receiver socket 222 formed in body 220 of second belt holder 22 as part of an effort to establish the opened child-seating-and-releasing mode of child restraint 10, most of second lock tab 802 is contained in that tab-receiver socket 222 and not available to be touched by a child or caregiver.

In a booster mode for juvenile seat 12 a passenger-restraint belt 100 of a vehicle is used to restrain an older child 11 seated in juvenile seat 12 rather than the child-restraint harness 14 as suggested in FIG. 9. Shoulder strap 102 of passenger-restraint belt 100 is arranged to extend upwardly into the downwardly opening strap-guide channel 226D defined between second belt holder 22 and seat back 18 as shown in FIGS. 9 and 9A.

A child restraint 10 includes a juvenile seat 12, a five-point child-restraint harness 14, and a belt retainer 20 as suggested in FIGS. 1 and 3. Juvenile seat 12 includes a seat bottom 16 and a seat back 18 arranged to extend upwardly from seat bottom 16.

Five-point child-restraint harness 14 includes a crotch belt 30 coupled to seat bottom 16, a first side belt 31 coupled to seat back 18, and a second side belt 32 coupled to seat back 18 as suggested in FIGS. 1 and 3. Crotch belt 30 includes a crotch strap 40 coupled to seat bottom 16 and a buckle 50 coupled to the free end of crotch strap 40. In illustrative embodiments, lower portions of first and second side belts 31, 32 pass through a space 17 provided at a junction between a rear portion of seat bottom 16 and a lower portion of seat back 18 as suggested in FIG. 3.

Belt retainer 20 includes a first belt holder 21 coupled to a first side of seat back 18 and associated with first side belt 31 and a second belt holder 22 coupled to a second side of seat back 18 and associated with second side belt 32 as suggested in FIGS. 1 and 3. Five-point child-restraint harness 14 has a closed child-restraining mode shown, for example, in FIG. 1 in which the first and second side belts 31, 32 are engaged to buckle 50 of crotch belt 30 to restrain a child 11 seated in juvenile seat 12. Five-point child-restraint harness 14 also has an alternative opened child-seating-and-releasing mode shown, for example, in FIG. 6 in which the first and second side belts 31, 32 are disengaged from buckle 50 of crotch belt 30.

In the opened child-seating-and-releasing mode of child-restraint harness 14 shown in FIG. 6, first side belt 31 is engaged with first belt holder 21 and second side belt 32 is engaged with second belt holder 22 to provide lateral separation between the first and second side belts 31, 32. First and second side belts 31, 32 are retained by first and second belt holders 21, 22 in such a separated position to provide an open child-receiving space 34 above seat bottom 16 and between the first and second side belts 31, 32. This use of belt retainer 20 in accordance with the present disclosure allows a caregiver to set a child 11 to be restrained on the juvenile seat 12 without having to move the first and second side belts 31, 32 apart with a first hand at the same time the child 11 is being placed in the juvenile seat 12 with a second hand. In the closed child-restraining mode of child-restraint harness 14 shown in FIG. 1, first side belt 31 is engaged with buckle 50 of crotch belt 30 and second side belt 32 is also engaged with buckle 50 to restrain the child 11 seated in juvenile seat 12.

First side belt 31 includes a first lock tab 70T that is retained in a first tab-receiving socket 501 formed in buckle 50 of crotch belt 30 when the five-point child-restraint harness 14 is in the closed child-restraining mode as shown in FIG. 1. First lock tab 70T alternatively is retained in a first tab-receiver socket 212 formed in the first belt holder 21 when the five-point child-restraint harness 14 is in the alternative opened child-seating-and-releasing mode as shown in FIG. 6.

Second side belt 32 includes a second lock tab 80T that is retained in a second tab-receiving socket 502 formed in buckle 50 of crotch belt when the five-point child-restraint harness 14 is in the closed child-restraining mode as shown in FIG. 1. Second lock tab 80T alternatively is retained in a second tab-receiver socket 222 formed in the second belt holder 22 when the five-point child-restraint harness 14 is in the alternative opened child-seating-and-releasing mode as shown in FIG. 6.

First side belt 31 of child-restraint harness 14 includes a first side strap 60 and a first strap anchor 70 as shown in FIGS. 1, 2A, and 6. First side strap 60 is coupled to seat back 18. First strap anchor 70 is coupled to first side strap 60 to move therewith relative to seat back 18 and includes the first lock tab 70T. First lock tab 70T is retained in a first tab-receiving socket 501 formed in buckle 50 of crotch belt 30 when the five-point child-restraint harness 14 is in the closed child-restraining mode as suggested in FIG. 1. First lock tab 70T is retained in a first tab-receiver socket 212 formed in first belt holder 21 when the five-point child-restraint harness 14 is in the alternative opened child-seating-and-releasing mode as suggested in FIGS. 2A and 6.

First belt holder 21 includes a first body 210 formed to include the first tab-receiver socket 212 configured to receive first lock tab 70T and a first body-support post 214 coupled to first body 210 as suggested in FIGS. 3 and 7. First body-support post 214 is arranged to support first body 210 in a predetermined location on the first side of seat back 18 to facilitate insertion of first lock tab 70T into the first tab-receiver socket 212 formed in first body 210 when the five-point child-restraint harness 14 is in the opened child-eating-and-releasing mode as suggested in FIGS. 2A and 6.

First body 210 has an underside (U) facing toward the first side 181 of the seat back 18 and a topside (T) facing away from the first side 181 of seat back 18 as shown, for example, in FIG. 7. First body 210 also has an inner side (I) extending between the underside (U) and the topside (T) and facing toward a child 11 seated in juvenile seat 12 and an outer side (O) extending between the underside (U) and the topside (T) and facing away from the inner side (I) as suggested in FIGS. 6-8. Inner side (I) is formed to include an opening into the first tab-receiver socket 212 as shown in FIGS. 6-8. First body-support post 214 is coupled to the underside (U) of first body 210 as shown in FIG. 7.

Seat back 18 includes a backrest 180 arranged to extend upwardly from the seat bottom 16 and a first side bolster 181 coupled to the first side of backrest 180 as shown in FIG. 6. First side bolster 181 is arranged to extend upwardly away from the seat bottom 16 and to project forwardly away from the seat back 18 in a direction toward a front edge of seat bottom 16 to provide the first side of seat back 18 as shown in FIGS. 1, 3, and 6. Seat back 18 also includes a first post mount 214M coupled to first side bolster 181 and configured to mate with a free end of first body-support post 214 to support first body 210 in a stationary position on first side bolster 181 of seat back 18 as suggested in FIG. 3.

Figure 10:
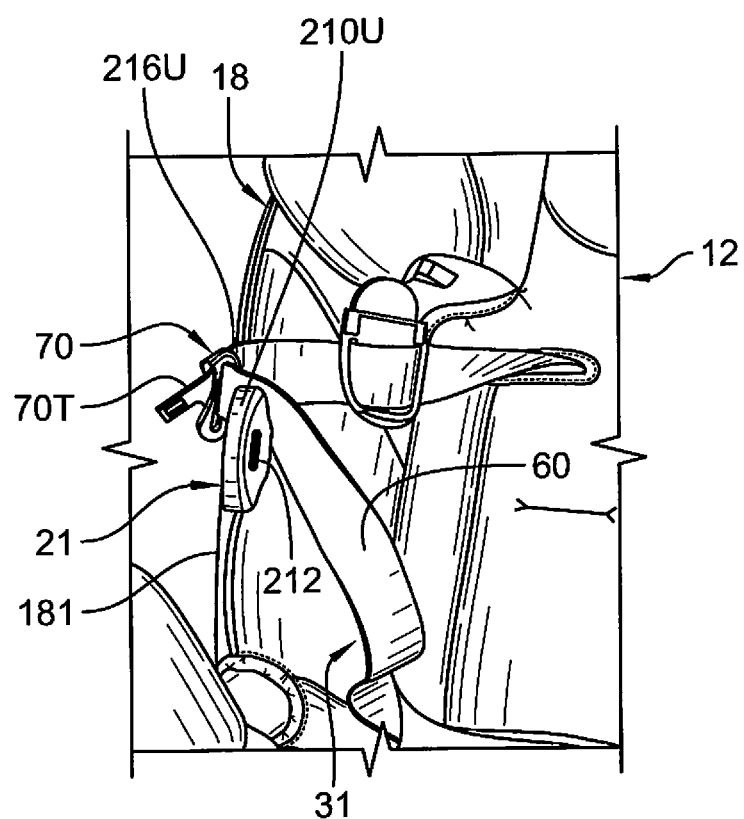
FIG. 10 is a perspective view similar to FIG. 2 showing placement of a portion of a side strap included in the first side belt in an upwardly opening strap-guide channel defined between the first belt holder and the seat back.

First body 210 and first side bolster 181 cooperate to form an upwardly opening strap-guide channel 216U therebetween as shown in FIG. 7 to receive and retain a portion of first side strap 60 therein to hold first lock tab 70T in a stationary position away from backrest 180 in the alternative opened child-seating-and-releasing mode of the child-restraint harness 14 as suggested in FIG. 10. This provides the caregiver with another option to hold first side belt 31 in a laterally separated position from second side belt 32 when seating a child 11 in juvenile seat 12. Second body 220 and second side bolster 182 cooperate to provide a similar upwardly opening strap-guide channel for second side belt 32.

Second belt holder 22 includes a second body 220 formed to include a second tab-receiver socket 222 configured to receive the second lock tab 80T and a second body-support post 224 coupled to second body 220 as suggested in FIG. 3. Second side belt 32 includes the second lock tab 80T that is retained in a second tab-receiving socket 502 formed in crotch buckle 50 when the five-point child-restraint harness 14 is in the closed child-restraining mode as suggested in FIG. 1. Second body-support post 224 is arranged to support second body 220 in a predetermined location on the second side of seat back 18 as suggested in FIGS. 2B, 3, and 6. Second lock tab 80T is retained in the second tab-receiver socket 212 formed in second body 220 when the five-point child restraint harness 14 is in the alternative opened child-seating-and-releasing mode as shown, for example, in FIGS. 2 and 6.

Seat back 18 also includes second side bolster 182 coupled to a second side of backrest 180 and arranged to lie in laterally spaced-apart relation to first side bolster 181 as shown in FIG. 3. Second side bolster 182 is arranged to extend upwardly away from the seat bottom 16 and to project forwardly away from the seat back 18 in a direction toward a front edge of seat bottom 16 to provide the second side of seat back 18 as shown in FIGS. 1, 3, and 6. Seat back 18 also includes a second post mount 224M coupled to second side bolster 182 and configured to mate with a free end of second body-support post 224 to support second body 210 in a stationary position on second side bolster 182 of seat back 18 as suggested in FIG. 3.

Seat back 18 includes a lower end 18L linked to seat bottom 16 and a free upper end 18U arranged to lie in spaced-apart relation to the lower end 18L as suggested in FIGS. 3 and 6. Each of the first and second body-support posts 214, 224 are arranged to lie midway between the lower and upper ends 18L, 18U of seat back 18 as suggested in FIG. 6.

Second side belt 32 of child-restraint harness 14 includes a second side strap 80 and a second strap anchor 90 as shown in FIGS. 1, 2B, and 6. Second side strap 80 is coupled to seat back 18. Second strap anchor 90 is coupled to second side strap 80 to move therewith relative to seat back 18 and includes the second lock tab 80T. Second lock tab 80T is retained in a second tab-receiving socket 502 formed in buckle 50 of crotch belt 30 when the five-point child-restraint harness 14 is in the closed child-restraining mode as suggested in FIG. 1. Second lock tab 80T is retained in a second tab-receiver socket 222 formed in second belt holder 22 when the five-point child-restraint harness 14 is in the alternative opened child-seating-and-releasing mode as suggested in FIGS. 2B and 6.

Second body 220 has an inner side (I) arranged to face toward the inner side (I) of the first body 210 and formed to include an opening into the second tab-receiver socket 222 as suggested in FIG. 3. Second body 220 further includes an underside (U) arranged to face toward the second side of seat back 18 and coupled to the second body-support post 224 as suggested in FIG. 3.

First belt holder 21 is formed to include an opening into the first tab-receiver socket 212 as suggested in FIGS. 3 and 6. Second belt holder 22 is formed to include an opening into the second tab-receiver socket 222 and oriented to cause the opening formed in the second belt holder 22 to face toward the opening formed in the first belt holder 21 as suggested in FIGS. 3 and 6.

First belt holder 21 is located on seat back 18 to lie at a first distance above the seat bottom 16 as suggested in FIG. 6. Second belt holder 122 is located on seat back 118 to lie at the first distance above the seat bottom 16 to locate a portion of the open child-receiving space 34 therebetween as suggested in FIG. 6.

As suggested in FIGS. 9 and 9A, second body 220 and second side bolster 182 cooperate to form a downwardly opening strap-guide channel 226D therebetween. This strap-guide channel 226D is located and sized to receive a portion of a shoulder strap 102 of a vehicle passenger-restraint belt 100 therein when juvenile seat 12 is used in a booster mode as shown in FIG. 9 and the five-point child-restraint harness 14 associated with juvenile seat 12 is used. Similarly, first body 210 and first side bolster 181 cooperate to form a downwardly opening strap-guide channel 216D therebetween that can also be used to receive and retain a portion of a shoulder strap included in a vehicle passenger-restraint belt.

The invention claimed is:

1. A child restraint comprising
a juvenile seat including a seat bottom and a seat back arranged to extend upwardly from the seat bottom,
a five-point child-restraint harness including a crotch belt coupled to the seat bottom, a first side belt coupled to the seat back, and a second side belt coupled to the seat back, the crotch belt including a crotch strap coupled to the seat bottom and a buckle coupled to the free end of the crotch strap, and
a belt retainer including a first belt holder coupled to a first side of the seat back and associated with the first side belt and a second belt holder coupled to a second side of the seat back and associated with the second side belt, wherein the five-point child-restraint harness has a closed child-restraining mode in which the first and second side belts are engaged to the buckle of the crotch belt to restrain a child seated in the juvenile seat and the five-point child-restraint harness has an alternative opened child-seating-and-releasing mode in which the first and second side belts are disengaged from the buckle of the crotch belt and the first side belt is engaged with the first belt holder and the second side belt is engaged with the second belt holder to provide lateral separation between the first and second side belts and retain the first and second side belts in such a separated position to provide an open child-receiving space above the seat bottom and between the first and second side belts to allow a caregiver to set a child to be restrained on the juvenile seat without having to move the first and second side belts apart with a first hand at the same time the child is being placed in the juvenile seat with a second hand,
wherein the first side belt includes a first side strap and a first strap anchor, the first side strap is coupled to the seat back, the first strap anchor is coupled to the first side strap to move therewith relative to the seat back and includes a first lock tab, the first lock tab is retained in a first tab-receiving socket formed in the buckle of the crotch belt when the five-point child-restraint harness is in the closed child-restraining mode, and the first lock tab is retained in a first tab-receiver socket formed in the first belt holder when the five-point child-restraint harness is in the alternative opened child-seating-and-releasing mode,
wherein the first belt holder includes a first body formed to include the first tab-receiver socket and a first body-support post coupled to the first body and arranged to support the first body in a predetermined location on the first side of the seat back to facilitate insertion of the first lock tab into the first tab-receiver socket formed in the first body when the five-point child-restraint harness is in the alternative opened child-seating-and-releasing mode.

2. The child restraint of claim 1, wherein the first body has an underside facing toward the first side of the seat back, a topside facing away from the first side of the seat back, an inner side extending between the underside and the topside and facing toward a child seated in the juvenile seat, and an outer side extending between the underside and the topside and facing away from the inner side, the first body-support post is coupled to the underside of the first body, and the inner side is formed to include an opening into the first tab-receiver socket.

3. The child restraint of claim 1, wherein the seat back includes a backrest arranged to extend upwardly from the seat bottom, a first side bolster coupled to a first side of the backrest and arranged to extend upwardly away from the seat bottom and to project forwardly away from the seat back in a direction toward a front edge of the seat bottom to provide the first side of the seat back, and a first post mount coupled to the first side bolster and configured to mate with a free end of the first body-support post to support the first body in a stationary position on the first side bolster of the seat back.

4. The child restraint of claim 3, wherein the first body and the first side bolster cooperate to form an upwardly opening strap-guide channel therebetween to receive and retain a portion of the first side strap therein to hold the first lock tab in a stationary position away from the backrest in the alternative opened child-seating-and-releasing mode of the child-restraint harness.

5. The child restraint of claim 3, wherein the first body and the first side bolster cooperate to form a downwardly opening strap-guide channel therebetween to receive and retain a portion of a shoulder strap of a vehicle passenger-restraint belt associated with juvenile vehicle seat when the juvenile seat is used in a booster mode.

6. The child restraint of claim 1, wherein the second belt holder includes a second body formed to include a second tab-receiver socket and a second body-support post coupled to the second body, the second side belt includes a second lock tab that is retained in a second tab-receiving socket formed in the crotch buckle when the five-point harness is in the closed child-restraining mode, the second body-support post is arranged to support the second body in a predetermined location on the second side of the seat back, and the second lock tab is retained in the second tab-receiver socket formed in the second body when the five-point child restraint harness is in the alternative opened child-seating-and-releasing mode.

7. The child restraint of claim 6, wherein the first body has an inner side formed to include an opening into the first tab-receiver socket and the second body has an inner side arranged to face toward the inner side of the first body and formed to include an opening into the second tab-receiver socket.

8. The child restraint of claim 7, wherein the first body further includes an underside arranged to face toward the first side of the seat back and coupled to the first body-support post and the second body further includes an underside arranged to face toward the second side of the seat back and coupled to the second body-support post.

9. The child restraint of claim 8, wherein the seat back includes a lower end linked to the seat bottom and a free upper end arranged to lie in spaced-apart relation to the lower end and each of the first and second body-support posts are arranged to lie midway between the lower and upper ends of the seat back.

10. The child restraint of claim 1, wherein the first belt holder is located on the seat back to lie a first distance above the seat bottom and the second belt holder is located on the seat back to lie at the first distance above the seat bottom to locate a portion of the open child-receiving space therebetween.

11. The child-restraint of claim 10, wherein the first side belt includes a first lock tab that is retained in a first tab-receiving socket formed in the buckle of the crotch belt when the five-point child-restraint harness is in the closed child-restraining mode and alternatively is retained in a first tab-receiver socket formed in the first belt holder when the five-point child-restraint harness is in the alternative opened child-seating-and-releasing mode and the second side belt includes a second lock tab that is retained in a second tab-receiving socket formed in the buckle of the crotch belt when the five-point child-restraint harness is in the closed child-restraining mode and alternatively is retained in a second tab-receiver socket formed in the second belt holder when the five-point child-restraint harness is in the alternative opened child-seating-and-releasing mode.

12. A child restraint comprising
a juvenile seat including a seat bottom and a seat back arranged to extend upwardly from the seat bottom,
a five-point child-restraint harness including a crotch belt coupled to the seat bottom, a first side belt coupled to the seat back, and a second side belt coupled to the seat back, the crotch belt including a crotch strap coupled to the seat bottom and a buckle coupled to the free end of the crotch strap, and
a belt retainer including a first belt holder coupled to a first side of the seat back and associated with the first side belt and a second belt holder coupled to a second side of the seat back and associated with the second side belt, wherein the five-point child-restraint harness has a closed child-restraining mode in which the first and second side belts are engaged to the buckle of the crotch belt to restrain a child seated in the juvenile seat and the five-point child-restraint harness has an alternative opened child-seating-and-releasing mode in which the first and second side belts are disengaged from the buckle of the crotch belt and the first side belt is engaged with the first belt holder and the second side belt is engaged with the second belt holder to provide lateral separation between the first and second side belts and retain the first and second side belts in such a separated position to provide an open child-receiving space above the seat bottom and between the first and second side belts to allow a caregiver to set a child to be restrained on the juvenile seat without having to move the first and second side belts apart with a first hand at the same time the child is being placed in the juvenile seat with a second hand,
wherein the first side belt includes a first side strap and a first strap anchor, the first side strap is coupled to the seat back, the first strap anchor is coupled to the first side strap to move therewith relative to the seat back and includes a first lock tab, the first lock tab is retained in a first tab-receiving socket formed in the buckle of the crotch belt when the five-point child-restraint harness is in the closed child-restraining mode, and the first lock tab is retained in a first tab-receiver socket formed in the first belt holder when the five-point child-restraint harness is in the alternative opened child-seating-and-releasing mode,
wherein the second side belt includes a second side strap and a second strap anchor, the second side strap is coupled to the seat back, the second strap anchor is coupled to the second side strap to move therewith relative to the seat back and includes a second lock tab, the second lock tab is retained in a second tab-receiving socket formed in the buckle of the crotch belt when the five-point child-restraint harness is in the closed child-restraining mode, and the second lock tab is retained in a second tab-receiver socket formed in the second belt holder when the five-point child-restraint harness is in the alternative opened child-seating-and-releasing mode,
wherein the first belt holder includes a first body formed to include the first tab-receiver socket and a first body-support post coupled to the first body and arranged to support the first body in a predetermined location on the first side of the seat back to facilitate insertion of the first lock tab into the first tab-receiver socket formed in the first body when the five-point child-restraint harness is in the closed child-restraining mode, and wherein the second belt holder includes a second body formed to include the second tab-receiver socket and a second body-support post coupled to the second body and arranged to support the second body in a predetermined location on the second side of the seat back to facilitate insertion of the second lock tab into the second tab-receiver socket formed in the second body when the five-point child-restraint harness is in the closed child-restraining mode,
wherein the first body has an inner side formed to include an opening into the first tab-receiver socket and the second body has an inner side arranged to face toward the inner side of the first body and formed to include an opening into the second tab-receiver socket.

13. The child restraint of claim 12, wherein the first body further includes an underside arranged to face toward the first side of the seat back and coupled to the first body-support post and the second body further includes an underside arranged to face toward the second side of the seat back and coupled to the second body-support post.

14. A child restraint comprising
a juvenile seat including a seat bottom and a seat back arranged to extend upwardly from the seat bottom,
a five-point child-restraint harness including a crotch belt coupled to the seat bottom, a first side belt coupled to the seat back, and a second side belt coupled to the seat back, the crotch belt including a crotch strap coupled to the seat bottom and a buckle coupled to the free end of the crotch strap, and
a belt retainer including a first belt holder coupled to a first side of the seat back and associated with the first side belt and a second belt holder coupled to a second side of the seat back and associated with the second side belt, wherein the five-point child-restraint harness has a closed child-restraining mode in which the first and second side belts are engaged to the buckle of the crotch belt to restrain a child seated in the juvenile seat and the five-point child-restraint harness has an alternative opened child-seating-and-releasing mode in which the first and second side belts are disengaged from the buckle of the crotch belt and the first side belt is engaged with the first belt holder and the second side belt is engaged with the second belt holder to provide lateral separation between the first and second side belts and retain the first and second side belts in such a separated position to provide an open child-receiving space above the seat bottom and between the first and second side belts to allow a caregiver to set a child to be restrained on the juvenile seat without having to move the first and second side belts apart with a first hand at the same time the child is being placed in the juvenile seat with a second hand, wherein the first side belt includes a first lock tab that is retained in a first tab-receiving socket formed in the buckle of the crotch belt when the five-point child-restraint harness is in the closed child-restraining mode and alternatively is retained in a first tab-receiver socket formed in the first belt holder when the five-point child-restraint harness is in the alternative opened child-seating-and-releasing mode, wherein the second side belt includes a second lock tab that is retained in a second tab-receiving socket formed in the buckle of the crotch belt when the five-point child-restraint harness is in the closed child-restraining mode and alternatively is retained in a second tab-receiver socket formed in the second belt holder when the five-point child-restraint harness is in the alternative opened child-seating-and-releasing mode, wherein the first belt holder is formed to include an opening into the first tab-receiver socket and the second belt holder is formed to include an opening into the second tab-receiver socket and oriented to cause the opening formed in the second belt holder to face toward the opening formed in the first belt holder.

\* \* \* \* \*